Sept. 18, 1928.
V. LINK
BRAKE
1,684,547
Filed Sept. 22, 1924
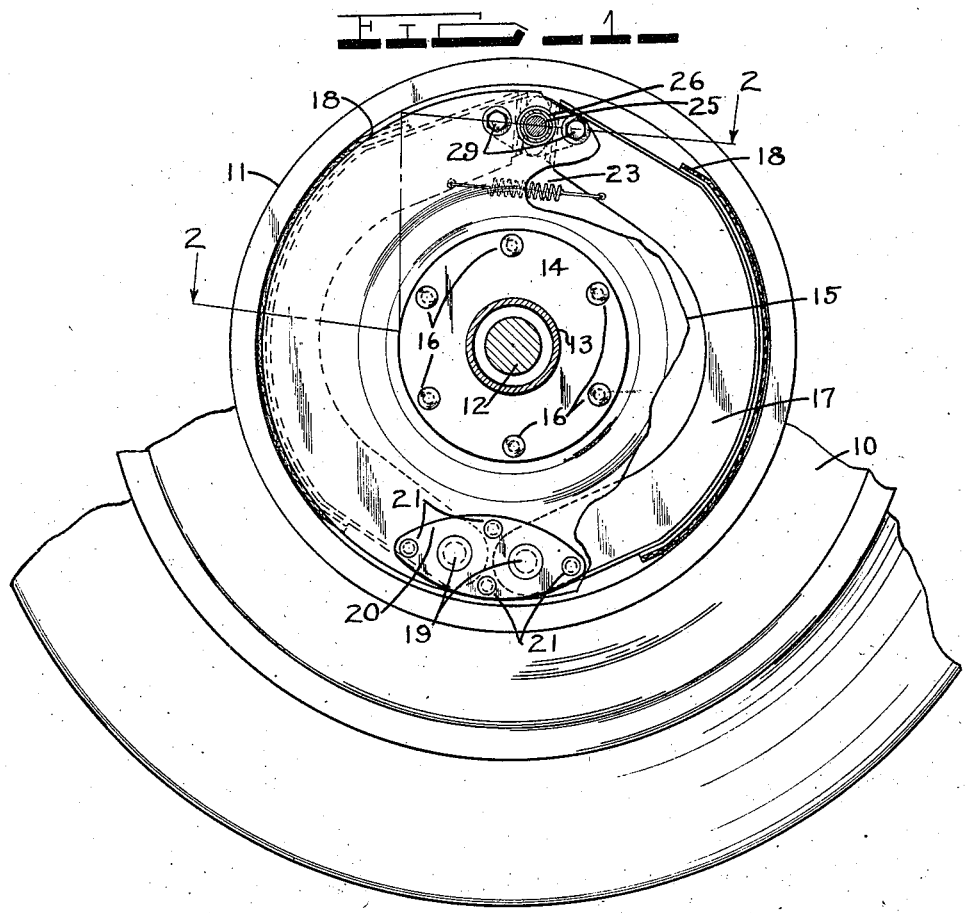
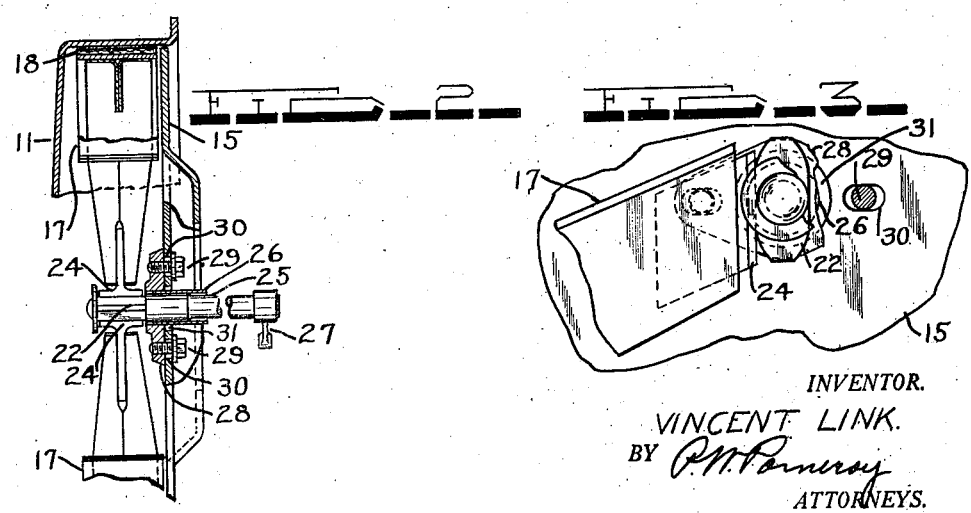
INVENTOR.
VINCENT LINK.
BY
ATTORNEYS.

Patented Sept. 18, 1928.

1,684,547

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed September 22, 1924. Serial No. 739,096.

This invention relates to vehicle brakes, and particularly to internal expanding shoe brakes.

Hitherto in conventional brakes of this type, the brake operating cam has been secured in a fixed position and trouble has been experienced in the assembling or relining of the brakes to obtain equal engagement between the brake shoes and the brake drum, in other words one brake shoe drags more than the other shoe resulting in one shoe lining wearing down faster than the other and giving unequal engagement. This occurs when the brake expanding cam is not centered properly between the ends of the respective brake shoes and may be caused either from brake shoe facings which are of uneven thickness, or from improper aligning of the various holes in the brake shoes or other parts when they are drilled or tapped. It is a well known fact that in the present day methods of producing parts for automobiles, that is, the quantity production methods, extreme care is not exercised in the various operations of drilling and tapping of holes and the like due to the shifting to a slight degree of the different jigs and fixtures used in these operations. For instance, in reference to brake shoes, the holes through which the pivot pins pass may be a little off center or the holes through which the rivets are inserted which secure the flat radial plates to the end of the shoes may be sufficiently off center when these parts are assembled and the brakes applied, to cause the brakes to operate unevenly.

With the above in view, it is one of the objects of the present invention to provide a means for positioning the brake operating cam in order that the brake shoes may have equal engagement with the brake drum.

A further object is to provide a means for supporting the brake cam bracket in such a manner that it may be secured in a variety of positions whereby the brake shoes can be centered in respect to the brake drum.

Another object is to provide the brake support with means for slidably attaching the brake cam bracket thereto and means for clamping said bracket to said support after the correct position of said bracket has been obtained.

Still another object is to provide the brake support with a plurality of slotted openings for receiving the securing screws, the screws being threaded into openings in the brake cam bracket which allows the screws to be moved in the slotted openings, thereby allowing movement of the brake cam bracket to the correct position between the ends of the brake shoes, after which the screws may be tightened to hold the brake cam bracket in fixed position against the brake support, thereby causing the brake shoes to have equal engagement with the brake drum upon rotation of the brake cam.

These being among the objects of the present invention, the same consists of certain combinations of parts and features of construction to be hereinafter described with reference to the accompanying drawing, which illustrates one suitable embodiment of the present invention, and then claimed having the above and other objects in view.

In the accompanying drawing, which illustrates a suitable embodiment of the present invention and in which like numerals refer to like parts throughout the several views, Figure 1 is a vertical section taken transversely of the rear axle housing and adjacent the left rear wheel of an automobile showing the brake mechanism in conjunction therewith.

Figure 2 is a fragmentary partially broken section taken substantially on the line 2—2 of Figure 1.

Figure 3 is an enlarged fragmentary broken view, looking from the inside of the drum towards the dust cover, showing one of the brake shoes, the brake cam bracket and a portion of the dust cover and illustrating more clearly the method of securing the bracket to the dust cover.

As illustrated, an automobile wheel 10 is shown having a brake drum 11 attached thereto, the wheel 10 being secured by a suitable means (not shown) to a rear axle shaft 12 contained within the rear axle housing 13 which terminates in a flanged portion 14. This flanged portion 14 supports a plate 15 that serves both as a dust cover and a brake support and which is secured to the flanged portion 14 by rivets 16.

Two internal brake shoes 17 faced with suitable friction brake lining 18 capable of engagement with the drum 11, are pivoted at one end on pins 19 which are supported by pin supporting brackets 20 secured to the dust cover 15 by rivets 21. The brackets 20 which are identical in shape are positioned one on each side of the plate 15 with the rivets extending therebetween to form a rigid base for the pins 19 which extend inwardly from the inner bracket 20. The other ends of the brake shoes 17 are held in contact with a brake expanding cam 22 by the tension in a coiled spring 23, the ends of the shoes 17 having flat radial plates 24 attached thereto to form contact surfaces with the cam 22.

The expanding cam 22 is secured to the end of a brake cam shaft 25 journaled in a tube 26 and operated by an arm 27 attached thereto. The tube 26 is supported adjacent the brake in a brake supporting bracket 28 and extends through an opening 31 in the dust cover 15 which is sufficiently large to permit considerable movement of the tube 26 therein, the bracket 28 being attached to the dust cover 15 by screws 29 that pass through slotted openings in the dust cover 15 (more clearly shown in Figure 3) and are threaded into bracket 28.

As previously stated, one of the objects of the present invention is to provide a means for positioning the brake cam in order that equal engagement may be had between the brake shoes and the brake drum. By the use of the above-mentioned components this means is accomplished as follows:—

After the brake shoes 17 have been surfaced with the friction material 18 and are assembled in their respective positions, that is, pivoted on the pins 19 and the faces 24 resting against the cam 22, the coil spring holds the faces 24 in contact therewith. The screws 29 which bolt the bracket 28 to the dust cover 15 are then loosened which allows the bracket 28 to move to adjust the position of the cam 22 between the ends of the shoes 17, and the brakes are placed in operative position, that is, the cam 22 is rotated to press the shoes against the brake drum. When the shoes 17 are expanded and one shoe engages with the drum 11 before the other, the cam bracket 28 will move in the slotted openings 30 until the other shoe makes its engagement with the drum 11 and creates an even and equal pressure between the shoes 17 and drum 11, by reason of the floating action of the bracket 28. The screw means 29 are then tightened thereby drawing the bracket 28 into locked position against the dust cover 15. Thereafter when the brakes are applied, the shoes will have equal engagement with the brake drum, resulting in a braking mechanism which will act more smoothly and in which the brake lining will wear more evenly.

While one embodiment of the present invention is shown in the accompanying drawing, it is apparent that formal changes may be made in the specific embodiment described without departing from the spirit and substance of the broad invention, the scope of which is commensurate with the appended claims.

What I claim is:—

1. In a vehicle brake, a brake drum, a plurality of shoes pivotally supported within said drum and movable to contact therewith, a cam to expand said shoes journaled in a bracket attached to a brake dust cover having a plurality of slotted openings therein, and screws received within said slotted openings and threaded into said bracket whereby said bracket can be moved and secured in position whereby said cam can apply equal pressure to said shoes.

2. The method of effecting equal application of brake shoes to a brake drum by means of a cam positioned between the ends of said shoes and journaled in a bracket mounted on a support, which consists in providing a slotted connection between said bracket and said support, loosening the bracket securing means to allow relative movement between said bracket and said support, rotating said cam to force said shoes against said drum, and thereafter locking said bracket to said support.

3. The method of effecting equal application of brake shoes to a brake drum by means of a cam, which consists in providing a brake cam support with slotted openings for receiving screw means which thread into a brake cam bracket, rotating said cam to expand said shoes into engagement with said drum, and tightening said screw means thereby locking said bracket in such position against said support.

4. In a vehicle brake, a brake drum, a plurality of shoes movable to contact therewith, a cam to engage said shoes with said drum, a shaft supporting said cam journaled in a bracket attached to a support, said support having a plurality of slotted openings therein, and means movable in said slots connecting said bracket and said support permitting said cam to be moved and secured in position to apply equal pressure to said shoes.

Signed by me at Detroit, Michigan, U. S. A., this 17 day of September, 1924.

VINCENT LINK.